US011281522B2

(12) United States Patent
Rathinasabapathy et al.

(10) Patent No.: US 11,281,522 B2
(45) Date of Patent: Mar. 22, 2022

(54) AUTOMATED DETECTION AND CLASSIFICATION OF DYNAMIC SERVICE OUTAGES

(71) Applicant: Microsoft Technology Licensing, LLC, Redmond, WA (US)

(72) Inventors: Mangalam Rathinasabapathy, Bellevue, WA (US); Priyanka Gundeli, Redmond, WA (US); Rahul Nigam, Bothell, WA (US); Mark R. Gilbert, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 16/556,589

(22) Filed: Aug. 30, 2019

(65) Prior Publication Data

US 2021/0064458 A1    Mar. 4, 2021

(51) Int. Cl.
  *G06F 11/00*      (2006.01)
  *G06F 11/07*      (2006.01)
  (Continued)

(52) U.S. Cl.
  CPC ...... *G06F 11/0793* (2013.01); *G06F 11/0709* (2013.01); *G06F 11/079* (2013.01); *G06F 11/0754* (2013.01); *H04L 67/10* (2013.01); *G06F 11/1433* (2013.01); *G06N 20/00* (2019.01)

(58) Field of Classification Search
  CPC ............. G06F 11/0793; G06F 11/0709; G06F 11/0754; G06F 11/079; G06F 11/1433; G06N 20/00; H04L 67/10
  See application file for complete search history.

(56) References Cited

U.S. PATENT DOCUMENTS

| 8,972,783 B2 | 3/2015 | Gupta et al. |
| 9,297,723 B1 | 3/2016 | Hofmann et al. |

(Continued)

FOREIGN PATENT DOCUMENTS

| EP | 3312725 A2 | 4/2018 |
| WO | 2016191639 A1 | 12/2016 |
| WO | 2019075399 A1 | 4/2019 |

OTHER PUBLICATIONS

Beer, Wolfgang, "Problem severity classifications now available", Retrieved From: https://www.dynatrace.com/news/blog/problem-severity-classifications-now-available/, May 9, 2017, 11 Pages.

(Continued)

*Primary Examiner* — Jonathan D Gibson
(74) *Attorney, Agent, or Firm* — Michael Best & Friedrich LLP

(57) ABSTRACT

Systems and methods for automatically detecting and mitigating errors in a cloud computing environment. One example method includes receiving, from a telemetry server, telemetry data for the cloud computing environment, detecting an error within the cloud computing environment based on the telemetry data, determining an error type for the error based on the telemetry data, determining an impact severity for the error based on the telemetry data, and when the error type is a reportable error type and the impact severity exceeds a predetermined threshold, performing a mitigation action.

20 Claims, 3 Drawing Sheets

(51) Int. Cl.
*H04L 67/10* (2022.01)
*G06N 20/00* (2019.01)
*G06F 11/14* (2006.01)

(56) References Cited

U.S. PATENT DOCUMENTS

| | | | |
|---|---|---|---|
| 10,379,838 B1* | 8/2019 | Chud | G06F 11/079 |
| 2010/0058108 A1* | 3/2010 | Nammatsu | G06F 11/0709 |
| | | | 714/4.1 |
| 2013/0339787 A1* | 12/2013 | Bala | G06F 11/1433 |
| | | | 714/15 |
| 2014/0201564 A1* | 7/2014 | Jagtiani | G06F 11/203 |
| | | | 714/4.11 |
| 2015/0002186 A1 | 1/2015 | Taft | |
| 2015/0163121 A1* | 6/2015 | Mahaffey | H04W 12/12 |
| | | | 707/687 |
| 2016/0062816 A1* | 3/2016 | Ivanova | G06F 11/0709 |
| | | | 726/26 |
| 2016/0352603 A1* | 12/2016 | VanAntwerp | H04L 65/605 |
| 2019/0031203 A1* | 1/2019 | Fox | B60W 50/0225 |
| 2019/0129788 A1* | 5/2019 | Fields | G06F 11/0709 |
| 2019/0286628 A1* | 9/2019 | Zhou | G06F 11/0751 |
| 2019/0377622 A1* | 12/2019 | Kurian | G06F 11/0754 |

OTHER PUBLICATIONS

Chen, et al., "Outage Prediction and Diagnosis for Cloud Service Systems", In Proceedings of the World Wide Web Conference, May 13, 2019, 7 Pages.

Jaechang, Nam, "Survey on Software Defect Prediction", In Technical report of the Hong Kong University of Science and Technology, Jul. 3, 2014, pp. 1-34.

Oki, et al., "Mobile Network Failure Event Detection and Forecasting with Multiple User Activity Data Sets", In Proceedings of the Thirtieth AAAI Conference on Innovative Applications of Artificial Intelligence, Apr. 27, 2018, pp. 7786-7792.

Ramachandran, Mahesh, "Anatomy of an IT Outage", Retrieved From: https://blog.opsramp.com/anatomy-of-an-it-outage, Oct. 6, 2015, 9 Pages.

Xue, et al., "Classification-based approach for cell outage detection in self-healing heterogeneous networks", In Proceedings of the IEEE Wireless Communications and Networking Conference (WCNC), Apr. 6, 2014, pp. 2822-2826.

Yu, et al., "Self-Organized Cell Outage Detection Architecture and Approach for 5G-H-CRAN", In Journal of Wireless Communications and Mobile Computing, May 10, 2018, 9 Pages.

"International Search Report and Written Opinion Issued in PCT Application No. PCT/US20/037349", dated Oct. 12, 2020, 13 Pages.

* cited by examiner

AUTOMATED DETECTION AND CLASSIFICATION OF DYNAMIC SERVICE OUTAGES

FIELD

Embodiments described herein relate to automatic detection, classification, and mitigation of service outages and, in particular, to systems and methods for error impact classification and mitigation in cloud computing environments.

SUMMARY

Cloud computing platforms and other shared computing environments provide software applications and services to users via the Internet and other networks. Applications that provide content creation, communication, and data storage and manipulation interact with one another and one or more hosting platforms. The software code for the applications and the platform is regularly updated to add features, correct errors, respond to user requests, and the like. In some cases, many individual or combined ("batch") software updates are applied weekly that include many thousands of code changes across some or all of the applications and platforms. Application of the changes to software systems sometimes degrades service for users (for example, by causing a software regression). In addition, each application or service may be dependent on one or more other software or network services for its operation. A service outage in one software or network service may therefore cause degraded service levels for users of other applications or services.

To monitor performance and gauge user experience, shared computing environments generate very large quantities of telemetry data, some of which may reflect service degradation or other negative impacts on the user experience. However, not all errors are equal in their impacts. For example, some errors may be caused by a request for a service or data that does not exist, while other errors may be caused by a request for a service that is not functioning. Some errors may have a limited impact (for example, a single user or group of users), while others may impact users system-wide or across multiple platforms. Current systems alert on call engineers based on a predefined error count. Once alerted the engineers collect logs from telemetry data and analyze the logs to determine what actions to take. This results in inefficient use of system resources and many hours of investigation and troubleshooting are spent determining the impacts and causes of service degradations.

To help reduce the time service outages, software regressions, and other errors affect a system, embodiments herein automatically classify particular error types and impacts, allowing errors to be detected and mitigated more quickly. This results in a better user experience. Some embodiments described herein therefore result in more efficient use of computing system resources, and the improved operation of computing systems for users.

In particular, one embodiment provides a system for automatically detecting and mitigating errors in a cloud computing environment. The system includes an anomaly detection server communicatively coupled to the cloud computing environment, the anomaly detection server including an electronic processor. The electronic processor is configured to receive, from a telemetry server, telemetry data for the cloud computing environment, detect an error within the cloud computing environment based on the telemetry data, determine an error type for the error based on the telemetry data, determine an impact severity for the error based on the telemetry data, and when the error type is a reportable error type and the impact severity exceeds a predetermined threshold, perform a mitigation action.

Another embodiment provides a method for a method for automatically detecting and mitigating errors in a cloud computing environment. The method includes receiving, from a telemetry server, telemetry data for the cloud computing environment, detecting an error within the cloud computing environment based on the telemetry data, determining an error type for the error based on the telemetry data, determining an impact severity for the error based on the telemetry data, and when the error type is a reportable error type and the impact severity exceeds a predetermined threshold, performing a mitigation action.

Yet another embodiment provides a non-transitory computer-readable medium including instructions executable by an electronic processor to perform a set of functions. The set of functions includes receiving, from a telemetry server, telemetry data for the cloud computing environment, detecting an error within the cloud computing environment based on the telemetry data, determining an error type for the error based on the telemetry data, determining an impact severity for the error based on the telemetry data, and when the error type is a reportable error type and the impact severity exceeds a predetermined threshold, performing a mitigation action.

DETAILED DESCRIPTION

Figure 1:
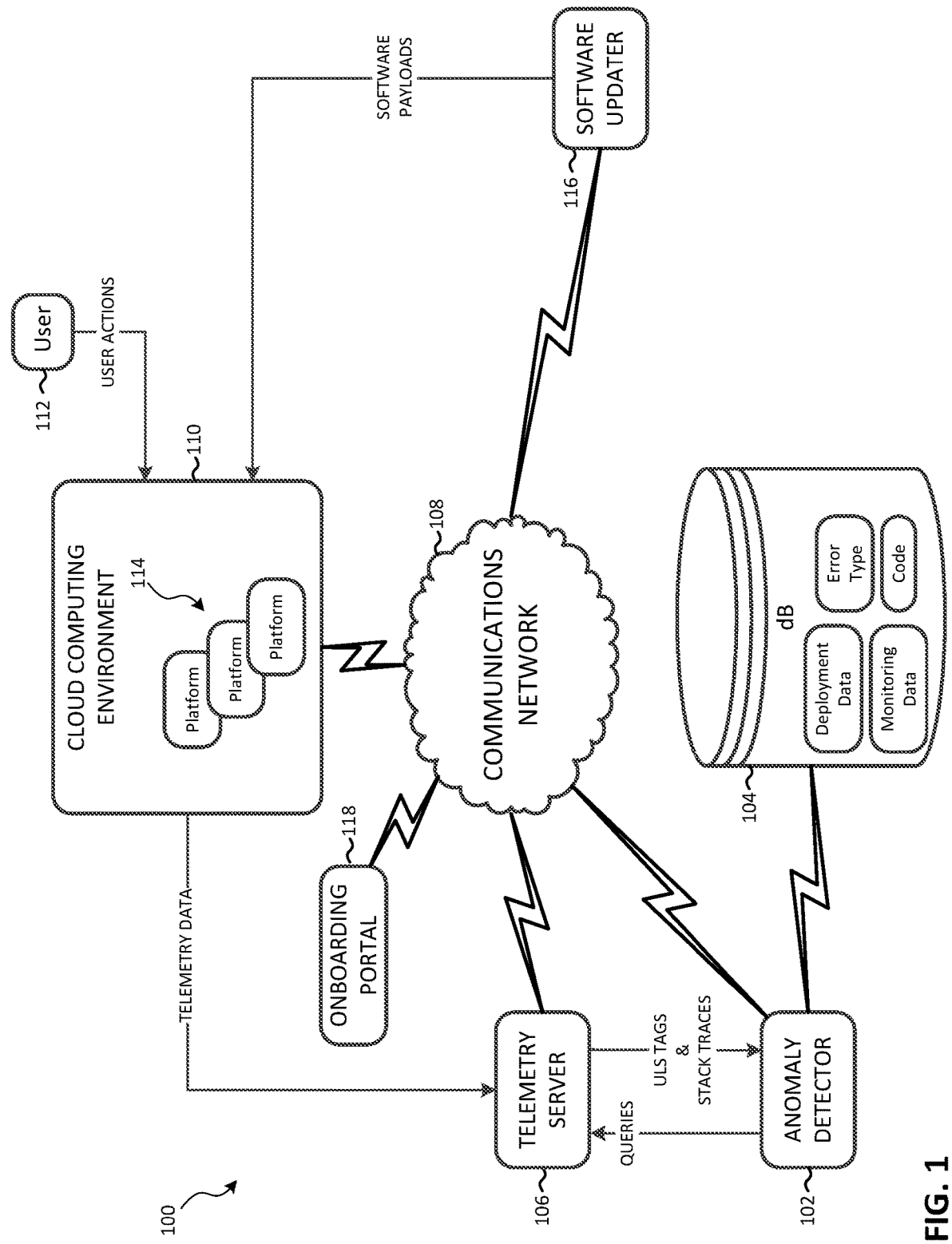
FIG. 1 schematically illustrates a system for detecting and mitigating errors in a cloud computing environment, according to some embodiments.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first, second, third, etc., top and bottom, and the like may be used herein solely to distinguish one entity or action from another entity or action without necessarily requiring or implying any actual such relationship or order between such entities or actions.

As noted, computing environments may experience errors that reduce computing system performance for affected users. Detection and classification of these errors may be time consuming and inefficient. Accordingly, embodiments described herein automatically analyze telemetry data to identify, classify, and mitigate software errors, service outages, and other system degradations.

FIG. 1 illustrates an example system 100 for automatically detecting and mitigating errors in a cloud computing environment. The system 100 includes an anomaly detection server 102, a database 104, and a telemetry server 106. It should be understood that the system 100 is provided as one example and, in some embodiments, the system 100 may include fewer or additional components. For example, the system 100 may include multiple anomaly detection servers 102, multiple databases 104, multiple telemetry servers 106, and combinations thereof.

The anomaly detection server 102, the database 104, the telemetry server 106, and other illustrated components are communicatively coupled via a communications network 108. The communications network 108 may be implemented using a wide area network (for example, the Internet), a local area network (for example, an Ethernet or Wi-Fi™ network), a cellular data network (for example, a Long Term Evolution (LTE™) network), and combinations or derivatives thereof.

Figure 2:
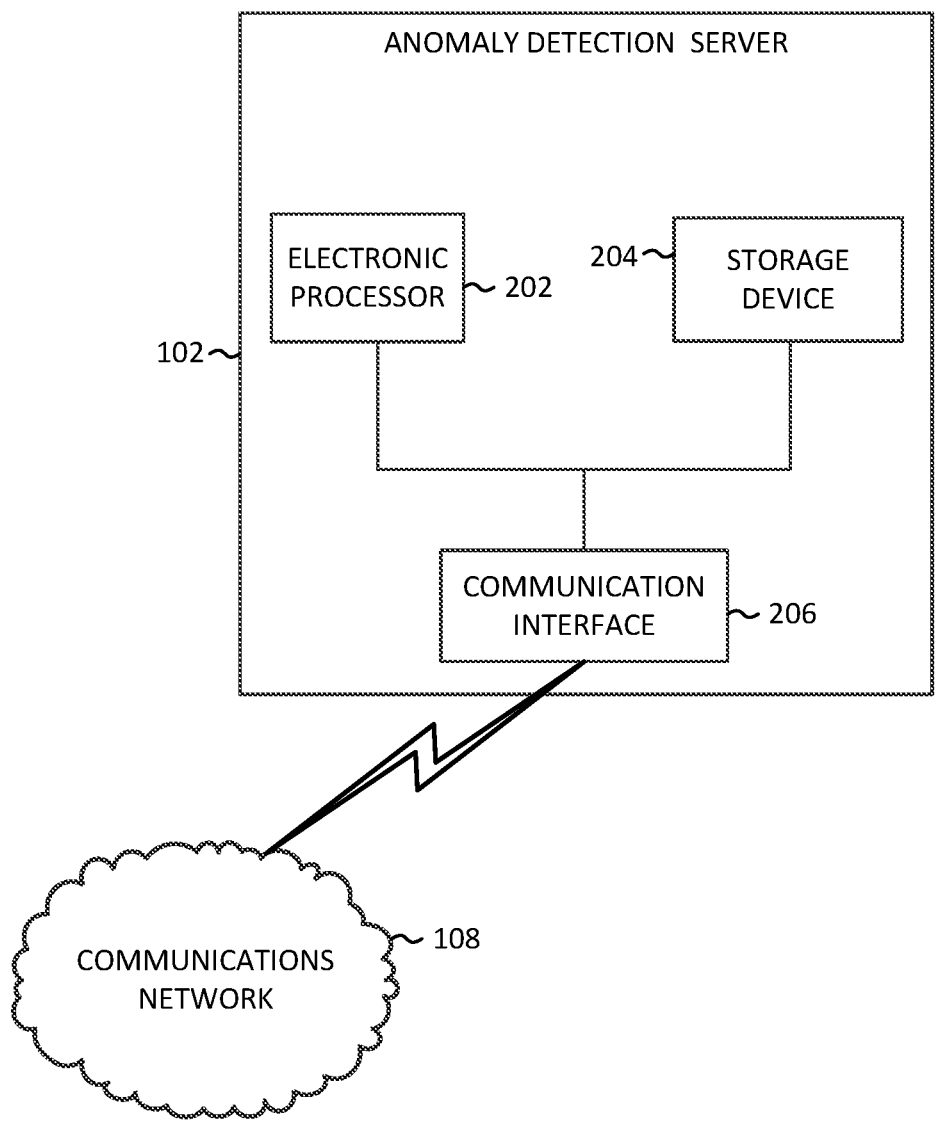
FIG. 2 schematically illustrates the anomaly detector of the system of FIG. 1, according to some embodiments.

FIG. 2 schematically illustrates the anomaly detection server 102 in more detail. In the example provided in FIG. 2, the resolution server 102 includes an electronic processor 202 (for example, a microprocessor, application-specific integrated circuit (ASIC), or another suitable electronic device), a storage device 204 (for example, a non-transitory, computer-readable storage medium), and a communication interface 206, such as a transceiver, for communicating over the communications network 108 and, optionally, one or more additional communication networks or connections. It should be understood that the anomaly detection server 102 may include additional components than those illustrated in FIG. 2 in various configurations and may perform additional functionality than the functionality described in the present application. Also, it should be understood that the functionality described herein as being performed by the anomaly detection server 102 may be distributed among multiple devices (for example, using multiple servers) and may be provided through a cloud computing platform, accessible by components of the system 100 via the communications network 108.

The electronic processor 202, the storage device 204, and the communication interface 206 included in the anomaly detection server 102 are communicatively coupled over one or more communication lines or buses, or combination thereof. The electronic processor 202 is configured to retrieve from the storage device 204 and execute, among other things, software to perform the methods described herein.

Returning to FIG. 1, the anomaly detection server 102, the database 104, and the telemetry server 106 exchange information via, among other means, the communications network 108, and operate to automatically detect and mitigate errors, for example, in a cloud computing environment 110. The cloud computing environment 110 operates to provide users (for example, the user 112) with applications and other computing services remotely, via one or more computing platforms 114. In some embodiments, each computing platform is a dedicated software environment (for example, a virtual server), which is secured from the other platforms and accessible by an authorized group of users. It should be understood that embodiments of the cloud computing environment 110 may include multiple platforms for serving tens, hundreds, or thousands of users. In some embodiments, the cloud computing environment 110 operates on a Microsoft® Azure® platform. Each of the platforms 114 may execute one or more operating systems, applications, or both. Examples of provided applications include Microsoft Office® and Office365® suites of applications (for example, Outlook®, Word®, Excel®, PowerPoint®, Internet Explorer®, and the like). In some embodiments, one or more of the platforms 114 provide hosting, collaboration, or other software services, such as, for example, the OneDrive® and SharePoint® platforms produced by Microsoft Corporation.

As users (for example, the user 112) interact with the platforms 114 of the cloud computing environment 110, telemetry data is generated. Telemetry data includes data points representing requests received by applications from users, dependencies (calls to external services by applications), traces (for example, diagnostic logging), events, performance metrics, and the like. The telemetry data also includes data points representing exceptions, for example, errors associated with one or more operations of the operating systems and software applications hosted by the plurality of platforms 114. In some embodiments, the cloud computing environment 110 provides the telemetry data to the telemetry server 106 using, for example, a unified logging service (ULS). In some embodiments, the telemetry server 106 is a network-attached and accessible computer server that includes similar components as the anomaly detection server 102. As described herein, the telemetry server 106 receives queries of telemetry data from the anomaly detection server 102 and transmits telemetry data, including ULS tags and stack traces (for example, from software exceptions, failed calls, and the like), to the anomaly detection server 102.

The anomaly detection server 102 is configured to detect system failures/errors on the platforms 114. A system error, as described herein, be a code defect, for example, the failure of a particular software feature to operate, an increased latency of a particular software feature, or a decreased reliability of a particular software feature. It should be understood that software features may include features of operating systems, applications, or other types of software operating on the platforms 114, the failure of which features degrades user experience, system performance, or both. A system error may also be a service outage, for example, the failure of an external (to the calling application) service to respond to a call from an application. Service outages may also include increased latency of the service, intermittent responses from the service, an overall degradation in the service's reliability, and the like.

The anomaly detection server 102 detects a system error for a platform 114 by analyzing the telemetry data for the platform in question. For example, the anomaly detection server 102 may detect an error for a platform when the error count for a particular failure type exceeds a predetermined failure threshold. As noted below, the anomaly detection server 102 may use a failure threshold to avoid reporting false positives or low impact problems. A false positive may be caused, for example, by user error, such as entry of a bad credential or corrupt data. In such case, a critical exception may be logged, but that exception may only occur once, or may occur several times but for just a single user (as determined by the ULS tag). In another case, multiple exceptions of a similar type may be received, each from a different user, exceeding the predetermined threshold.

In some embodiments, the anomaly detection server 102 is configured to detect system errors by applying a machine learning model (for example, a convolutional neural network trained on historical telemetry data associated with known failures and known successful operation of the platform in question). Machine learning generally refers to the ability of a computer program to learn without being explicitly programmed. In some embodiments, a computer program (sometimes referred to as a learning engine) is configured to construct a model (for example, one or more algorithms) based on example inputs. Supervised learning involves presenting a computer program with example inputs and their desired (actual) outputs. The computer program is configured to learn a general rule (a model) that maps the inputs to the outputs in the training data. Machine learning may be performed using various types of methods and mechanisms. Example methods and mechanisms include decision tree learning, association rule learning, artificial neural networks, inductive logic programming, support vector machines, clustering, Bayesian networks, reinforcement learning, representation learning, similarity and metric learning, sparse dictionary learning, and genetic algorithms. Using some or all of these approaches, a computer program may ingest, parse, and understand data and progressively refine models for data analytics, including image analytics. Once trained, the computer system may be referred to as an intelligent system, an artificial intelligence (AI) system, a cognitive system, or the like.

Accordingly, the anomaly detection server 102 may be trained using machine learning techniques to establish an operational baseline for the platform 114, which the anomaly detection server 102 uses to detect errors (such as an amount or frequency of errors) deviating from the baseline. In some embodiments, the anomaly detection server 102 detects a system error for one or more features of a platform 114 using a support vector machine to assess how many users are affected over how many sites. For example, the anomaly detection server 102 may determine that a system error has occurred when a particular error affects a number of users that exceeds a predetermined threshold of users. In some embodiments, the anomaly detection server 102 uses weighted graphs to detect a system error for a platform 110 operating on a cluster.

In some embodiments, the system 100 and the platforms 114 may be used by one or more partners. A partner is a group of users, for example, an organization or a division within an organization. Embodiments of the system 100 operate to receive configuration and other types of information from partners, for example, via an onboarding portal 118. For example, a partner may submit policies for their platform(s) that indicate thresholds used to detect errors, which errors represent critical errors to their users, and the like. In some embodiments, the partners submit machine learning models, which are used by the anomaly detection server 102 to determine whether a system error is occurring on a partner's platform(s).

The applications and services hosted by the platforms 114 within the cloud computing environment 110 are provided by, among other things, electronic processors executing software code. Developers of the platforms 114 and the cloud computing environment 110 patch and update the software code using a software updater 116. In some embodiments, the software updater 116 is a network accessible server that includes similar components as the anomaly detection server 102. The software updater 116 operates to rollout software payloads (including one or more software updates) to the platforms 114. In some embodiments, software payloads may include many (for example, one thousand or more) changes to the code executed by the cloud computing environment 110. In some embodiments, the code changes are released using software flighting, which includes information that defines which software features area enabled for which applications or services. In some embodiments, the implementation of code changes is controlled using a killswitch service, which allows the cloud computing environment 110 to activate code changes in a controlled fashion.

The database 104 electronically stores information relating to the cloud computing environment 110 and the operations of the anomaly detection server 102. In the embodiment illustrated, the database 104 is a database housed on a suitable database server communicatively coupled to and accessible by the anomaly detection server 102. In alternative embodiments, the database 104 is locally stored on the anomaly detection server 102. In some embodiments, the database 104 is part of a cloud-based database system external to the system 100 and accessible by the anomaly detection server 102 over one or more additional networks. In some embodiments, as illustrated in FIG. 1, the database 104 electronically stores or accesses code data, deployment data, monitoring data, and error type data.

The code data includes information about the code executed by the cloud computing environment 110. In some embodiments, code data includes information provided to the anomaly detection server 102 by the software updater 116, including a series of code change lists that make up the software payloads and metadata associated with the software payloads. In some embodiments, the metadata includes a plurality of key value pairs, each including a software feature and a code segment associated with the software feature, identifying which code segment implements which software feature. The metadata may also include data on change list owners (for example, contact information for a software developer or engineer responsible for the code changes in the change list). The metadata may also identify whether the software features are controlled using a reversion mechanism, for example, a flight on rails service or a killswitch service.

Deployment data includes information on the platforms 114 hosting the applications and services, including which software build is being executed and which software payloads have been rolled out to which platforms.

Monitoring data includes alerts, exceptions, and performance metrics. In some embodiments, the monitoring data includes telemetry data, for example, telemetry data received from the cloud computing environment 110 or the telemetry server 106.

Error type data includes information relating to the errors detected by the anomaly detection server 102. In some embodiments, error data includes error metadata (for example, user identifiers, timestamps, system traces, and the like). Error data also includes determinations made about the errors by the anomaly detection server 102, as described below. For example, the error data may include error classifications and measures of the errors' impacts on users and the cloud computing environment.

As described herein, in some embodiments, the anomaly detection server 102 uses various machine learning methods to analyze the data stored in the database 130.

Figure 3:
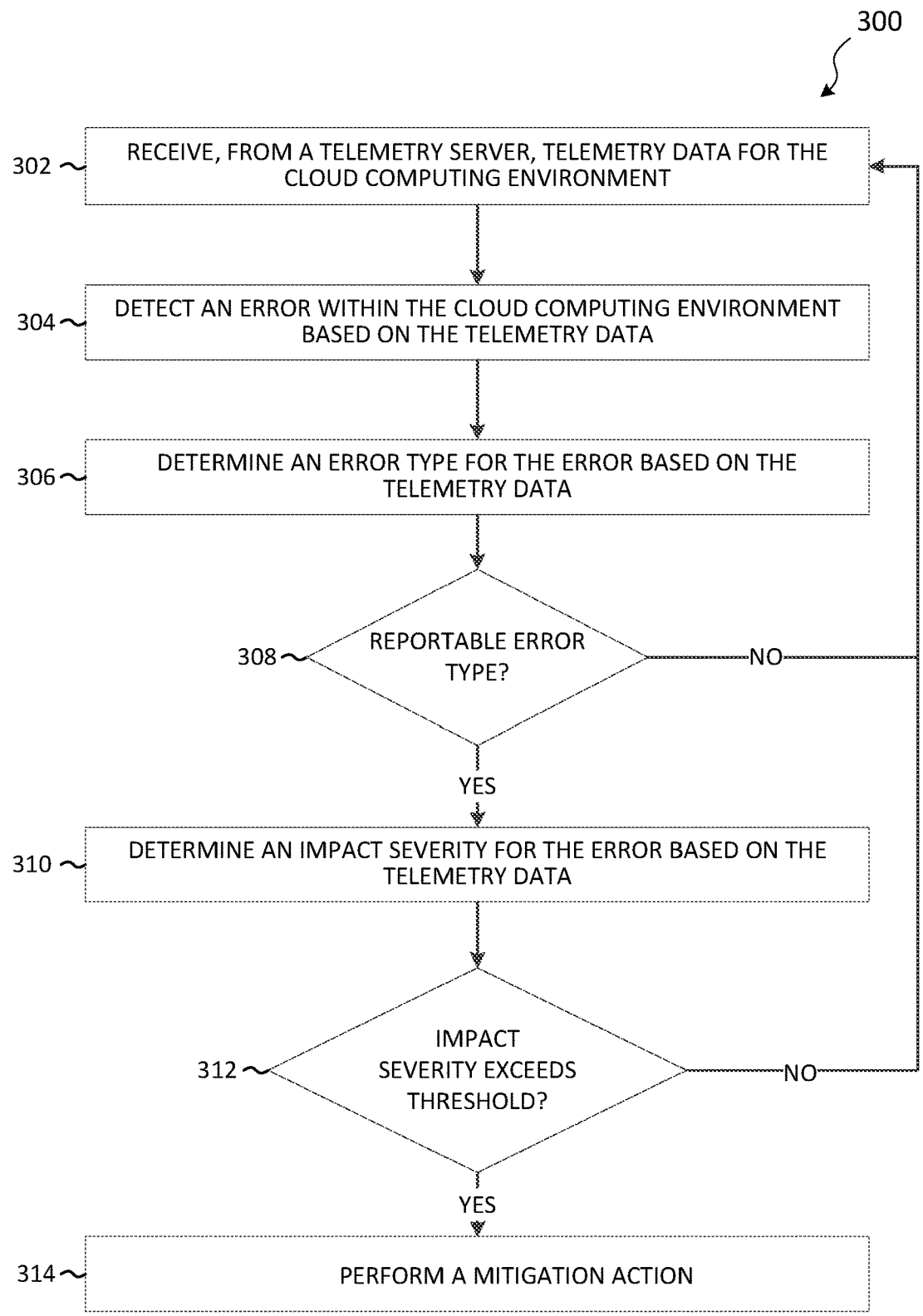
FIG. 3 is a flowchart illustrating a method performed by the system of FIG. 1 for automatically detecting and mitigating errors in a cloud computing environment, according to some embodiments.

FIG. 3 illustrates an example method 300 for automatically detecting and mitigating errors in a cloud computing environment. The method 300 is described as being performed by the system 100, and, in particular, the anomaly detection server 102 and the electronic processor 202. However, it should be understood that in some embodiments, portions of the method 300 may be performed by other devices, including for example, the telemetry server 106. As an example, the method 300 is described in terms of the anomaly detection server 102 and other components operating to detect, classify, and mitigate errors in a single cloud computing environment 110. However, it should be understood that embodiments of the method 300 may be used with multiple quantities and types of computing environments, arranged in various combinations. It should also be understood that embodiments of the method 300 may be used by embodiments of the system 100 that include more than one anomaly detection server 102, telemetry server 106, or software updater 116.

At block 302, the electronic processor 202 receives, from the telemetry server 106, telemetry data for the cloud computing environment 110. In some embodiments, the anomaly detection server 102 receives telemetry data pushed from the telemetry server 106 (for example, as continuous or periodic updates). In some embodiments, the anomaly detection server 102 receives telemetry data in response to a periodic query sent by it to the telemetry server 106. In some embodiments, the telemetry data includes one or more of application usage data, a unified logging service (ULS) tag, a stack trace, a dependency, an event, a performance metric, and the like.

At block 304, the electronic processor 202 detects an error within the cloud computing environment based on the telemetry data. The electronic processor 202 detects error by analyzing the telemetry data. In some embodiments, errors are detecting by looking for error codes indicating, for example, a failed login, a failed document operation, a software exception, a failed call to a service, responses that exceed acceptable timeframes, and the like. In some embodiments, an error is not detected until an error count exceeds a failure threshold. For example, a single failed login may not cause an error to be detected, while ten failed logins within one minute would register as an error. In another example, the same error reported from multiple users may trigger an error detection where a single error from a single user would not. In some embodiments, machine learning is used to detect errors. For example, a machine learning model may determine that a particular sequence of error codes represents an error, while another sequence of error codes of similar size is not indicative of an error.

Regardless of how the error is determined, at block 306, the electronic processor 202 determines an error type for the error based on the telemetry data. Error types include a code defect error, a benign error, a service outage error, and an ambiguous error. A code defect error indicates a software regression caused by a failure in the software code executed in the cloud computing environment 110. A benign error indicates an error that does not result in a significant system impact. For example, the error may be isolated to a single user or a seldom-used application feature, or may otherwise be minor in nature. In another example, a benign error may be one with a simple known solution (for example, an error caused by the revision of software being used to access an application or platform). A service outage error indicates that a service relied on by one or more applications is not responsive or is responding incorrectly, causing the affected applications to slow down or stop working. Ambiguous errors are those errors that the electronic processor 202 is not able to classify. In some embodiments, the errors may be further classified using sub-types. For example, a service outage error may be further classified as either a hardware failure (for example, a server is not responding at all), a software failure (for example, the service is responding, but with corrupt or incorrect data), a network failure (for example, severe latency between the application and the service), or an environmental error (for example, a power outage in an area where the service is hosted).

In some embodiments, the telemetry data includes natural language associated with the error. For example, the telemetry data may include voice commands entered by users, narratives from a trouble ticket, or other human or machine-generated plain language describing or otherwise pertaining to the error. In such embodiments, the electronic processor 202 is configured to determine the error type for the error by analyzing the natural language using a machine learning model (for example, a neural network). In some embodiments, the machine learning model is trained on historical telemetry data generated by the cloud computing environment 110.

At block, 308, the electronic processor 202 determines whether the error type is reportable. A reportable error type is one which requires reporting to system operators (for example, to determine how to prevent the error in the future). For example, in some embodiments, code defects, service outages, and ambiguous errors are reportable errors. Code defects are reportable because they may be able to be mitigated in the short term and should be addressed by system developers in future software updates to reduce future errors in the cloud computing environment 110. Service outages are reportable because they should be fixed to improve the current functioning of the cloud computing environment 110. Ambiguous errors should be reported to system operators for further investigation.

As illustrated in FIG. 3, in some embodiments, when the electronic processor 202 determines (at block 308) that the error is not reportable, it continues receiving telemetry data and checking for errors, at block 302.

At block 310, when the electronic processor determines that the error is reportable (at block 308), the electronic processor 202 determines an impact severity for the error based on the telemetry data. The impact severity is a measure of the impact of the error in relation to the cloud computing environment 110. In some embodiments, the impact severity is measured using a numerical value (for example, a number assigned from 1 to 10 or a percentage, with higher values indicating higher severity levels). In some embodiments, the impact severity is measured by using a rating system classifying the impact as, for example, very low, low, moderate, or serious.

In some embodiments, electronic processor 202 determines the impact severity based on one or more of the following: a quantity of users using a feature associated with the error (for example, as provided by the cloud computing environment 110), an access type for a feature associated with the error (for example, a browser type used by the user 112 to access the feature), a quantity of users experiencing the error, a quantity of users actively using a platform affected by the error, and a quantity of sites (for example, platforms) experiencing the error. Optionally or in addition, electronic processor 202 determines the impact severity based on one or more of the following: a characteristic of at least one user associated with the error (for example, are the users considered "priority" users, such as public safety users), a characteristic of at least one site associated with the error (for example, whether the site is used by one or more large partners), a characteristic of at least one device associated with the error (for example, whether the error is affecting mobile users, desktop users, or both), and a characteristic of at least one network associated with the error (for example, whether the error is limited to a particular access network, or is occurring on a network used by a priority partner).

Optionally or in addition, electronic processor 202 determines the impact severity based on a geographic impact for the error (for example, whether the error is localized or more widespread). The geographic impact for the error may be the total number and/or density of areas affected by the error (for example, when the error is a service outage error). Geographic impacts may also be determined based on predefined geofences overlaying physical geographic areas or particular cites, states, counties, and the like.

Optionally or in addition, electronic processor 202 determines the impact severity based on particular characteristics of the error itself (for example, which platforms are directly affected by the error, third-party programs or input provided by the user(s) that contribute to the error, the number of features of the platform rendered unavailable due to the error, and the like).

At block 312, the electronic processor 202 determines whether the impact severity exceeds a predetermined threshold (for example, an impact threshold). The impact threshold is set such that when exceeded, it is determined that an error is severe enough to merit mitigation, as described below. The severity threshold may be a numerical value (for example, a value of 50% or higher), a rating level (for example, "moderate" or above), or another type of value. For example, in some embodiments, the severity threshold may be set based on the number (for example, a quantity or percentage) of users impacted by the error.

As illustrated in FIG. 3, in some embodiments, when the electronic processor 202 determines (at block 312) that the impact severity does not exceed the severity threshold, it continues receiving telemetry data and checking for errors, at block 302. In some embodiments, when the error type is a reportable error type and the impact severity does not exceed the severity threshold, the electronic processor 202 transmits an electronic message including the error (for example, to a system operator) to report the error.

At block 314, when the error type is a reportable error type and the impact severity exceeds the severity threshold, the electronic processor 202 performs a mitigation action. A mitigation action includes one or more actions that contain the error, correct the error, or both, to improve the functioning of the cloud computing environment 110. For example, the electronic processor 202 generates an incident management system (IcM) log entry. In another example, the electronic processor 202 transmits an electronic message to a partner associated with the error (for example, opening a trouble ticket with a provider of a service that is experiencing an outage). In another example, the electronic processor 202 issues commands to the software updater 116 to, for example, roll back a software update, halt deployment of a multi-system software update, or both. In some embodiments, the mitigation action includes transmitting a message to users affected or potentially affected by the error. The message may include instructions on how to fix the error or that the error is currently being addressed.

In some embodiments, the electronic processor 202, after performing a mitigation action, waits for a predetermined period of time, and polls the system 100 to determine if there are more errors reported for the same software features. When no problems have been reported after the predetermined time, electronic processor 202 may report (for example, to a cloud computing environment manager, a user, and the like) that the error has been resolved.

Various features and advantages of some embodiments are set forth in the following claims.

What is claimed is:

1. A system for automatically detecting and mitigating errors in a cloud computing environment, the system comprising:
   an anomaly detection server communicatively coupled to the cloud computing environment, the anomaly detection server including an electronic processor configured to:
      receive, from a telemetry server, telemetry data for the cloud computing environment;
      detect an error within the cloud computing environment based on the telemetry data;
      determine an error type for the error based on the telemetry data;
      determine an impact severity for the error based on the telemetry data;
      when the error type is a reportable error type and the impact severity exceeds a predetermined threshold, perform a mitigation action; and
      when the error type is a reportable error type and the impact severity does not exceed a predetermined threshold, transmit an electronic message including the error,
      wherein performing the mitigation action includes issuing a command to a software updater for the cloud computing environment to execute at least one selected from the group consisting of rolling back a deployed software update and halting deployment of a multi-system software update, and
      wherein the error is of a reportable error type when the error is one which requires reporting to a system operator of the cloud computing environment.

2. The system of claim 1, wherein
   the telemetry data includes natural language associated with the error, and
   the electronic processor is configured to determine the error type for the error by analyzing the natural language using a machine learning model.

3. The system of claim 2, wherein the machine learning model is trained using historical telemetry data associated with the cloud computing environment.

4. The system of claim 1, wherein the telemetry data includes at least one selected from the group consisting of application usage data, a unified logging service (ULS) tag, a stack trace, a dependency, an event, and a performance metric.

5. The system of claim 1, wherein the error type is one selected from the group consisting of a code defect error, a benign error, a service outage error, and an ambiguous error.

6. The system of claim 1, wherein the electronic processor is configured to determine the impact severity for the error based on at least one selected from the group consisting of a quantity of users using a feature associated with the error, an access type for a feature associated with the error, a quantity of users experiencing the error, a quantity of sites experiencing the error, and a geographic impact for the error.

7. The system of claim 1, wherein the electronic processor is configured to determine the impact severity for the error based on at least one selected from the group consisting of a characteristic of at least one user associated with the error, a characteristic of at least one site associated with the error, a characteristic of at least one device associated with the error, and a characteristic of at least one network associated with the error.

8. The system of claim 1, wherein the electronic processor is configured to perform the mitigation action by further performing at least one selected from the group consisting of generating an incident management system log entry and transmitting an electronic message to a partner associated with the error.

9. A method for automatically detecting and mitigating errors in a cloud computing environment, the method comprising:
    receiving, from a telemetry server, telemetry data for the cloud computing environment;
    detecting an error within the cloud computing environment based on the telemetry data;
    determining an error type for the error based on the telemetry data;
    determining an impact severity for the error based on the telemetry data; and
    when the error type is a reportable error type and the impact severity exceeds a predetermined threshold, performing a mitigation action that includes issuing a command to a software updater for the cloud computing environment to execute at least one selected from the group consisting of rolling back a deployed software update and halting deployment of a multi-system software update, and
    wherein the error is of a reportable error type when the error is one which requires reporting to a system operator of the cloud computing environment.

10. The method of claim 9, further comprising:
    when the error type is a reportable error type and the impact severity does not exceed a predetermined threshold, transmitting an electronic message including the error.

11. The method of claim 9, wherein
    receiving telemetry data for the cloud computing environment includes receiving natural language associated with the error; and
    determining the error type for the error includes analyzing the natural language using a machine learning model.

12. The method of claim 11, wherein analyzing the natural language using a machine learning model includes analyzing the natural language using a machine learning model trained using historical telemetry data associated with the cloud computing environment.

13. The method of claim 9, wherein receiving telemetry data includes receiving at least one selected from the group consisting of application usage data, a unified logging service (ULS) tag, a stack trace, a dependency, an event, and a performance metric.

14. The method of claim 9, wherein determining the error type includes determining one selected from the group consisting of a code defect error, a benign error, a service outage error, and an ambiguous error.

15. The method of claim 9, wherein determining an impact severity for the error includes determining the impact severity based on at least one selected from the group consisting of a quantity of users using a feature associated with the error, an access type for a feature associated with the error, a quantity of users experiencing the error, a quantity of sites experiencing the error, and a geographic impact for the error.

16. The method of claim 9, wherein determining the impact severity for the error includes determining the impact severity based on at least one selected from the group consisting of a characteristic of at least one user associated with the error, a characteristic of at least one site associated with the error, a characteristic of at least one device associated with the error, and a characteristic of at least one network associated with the error.

17. The method of claim 9, wherein performing the mitigation action includes further performing at least one selected from the group consisting of generating an incident management system log entry and transmitting an electronic message to a partner associated with the error.

18. A non-transitory computer-readable medium including instructions executable by an electronic processor to perform a set of functions, the set of functions comprising:
    receiving, from a telemetry server, telemetry data for the cloud computing environment;
    detecting an error within the cloud computing environment based on the telemetry data;
    determining an error type for the error based on the telemetry data;
    determining an impact severity for the error based on the telemetry data;
    when the error type is a reportable error type and the impact severity exceeds a predetermined threshold, performing a mitigation action; and
    when the error type is a reportable error type and the impact severity does not exceed a predetermined threshold, transmit an electronic message including the error,
    wherein performing the mitigation action includes issuing a command to a software updater for the cloud computing environment to execute at least one selected from the group consisting of rolling back a deployed software update and halting deployment of a multi-system software update, and
    wherein the error is of a reportable error type when the error is one which requires reporting to a system operator of the cloud computing environment.

19. The computer-readable medium of claim 13, the set of functions further comprising:
    receiving telemetry data for the cloud computing environment includes receiving natural language associated with the error; and
    determining an error type for the error includes analyzing the natural language using a machine learning model trained using historical telemetry data associated with the cloud computing environment.

20. The computer-readable medium of claim 13, wherein the error type is one selected from the group consisting of a code defect error, a benign error, a service outage error, and an ambiguous error.

* * * * *